US008289888B2

(12) United States Patent
Gromakov

(10) Patent No.: US 8,289,888 B2
(45) Date of Patent: Oct. 16, 2012

(54) SYSTEM FOR CELLULAR COMMUNICATIONS AND ITS UNITS

(76) Inventor: Yury Alexeevich Gromakov, Moscow (RU)

( * ) Notice: Subject to any disclaimer, the term of this patent is extended or adjusted under 35 U.S.C. 154(b) by 386 days.

(21) Appl. No.: 11/661,168

(22) PCT Filed: Mar. 20, 2006

(86) PCT No.: PCT/RU2006/000127
§ 371 (c)(1),
(2), (4) Date: Feb. 23, 2007

(87) PCT Pub. No.: WO2007/015655
PCT Pub. Date: Feb. 8, 2007

(65) Prior Publication Data
US 2008/0090578 A1  Apr. 17, 2008

(30) Foreign Application Priority Data

Jul. 27, 2005  (RU) ................................ 2005123827

(51) Int. Cl.
*H04L 5/14* (2006.01)
(52) U.S. Cl. ........ 370/274; 370/279; 370/293; 370/315; 455/11.1; 455/13.1; 455/16; 455/561
(58) Field of Classification Search .......... 370/310–350; 455/400–466, 550.1–575.9
See application file for complete search history.

(56) References Cited

U.S. PATENT DOCUMENTS

| 7,349,665 | B1 * | 3/2008 | Zhu et al. ...................... 455/11.1 |
| 2006/0193280 | A1 * | 8/2006 | Lee et al. ........................ 370/315 |
| 2007/0010196 | A1 * | 1/2007 | Periyalwar et al. ............... 455/7 |
| 2007/0058577 | A1 * | 3/2007 | Rubin ............................ 370/328 |
| 2007/0160014 | A1 * | 7/2007 | Larsson ......................... 370/338 |
| 2008/0075178 | A1 * | 3/2008 | Lappetelainen et al. ...... 375/260 |

* cited by examiner

*Primary Examiner* — Anthony Addy
*Assistant Examiner* — Shahriar Behnamian
(74) *Attorney, Agent, or Firm* — Ladas & Parry LLP

(57) ABSTRACT

Inventions relate to a field of radio communications and may be used for a creation of systems for cellular communications. The achieved technical result — an extension of a coverage area of a communication network. A system for cellular communication comprises a switch subsystem, a base station subsystem which are interconnected with a controller of base stations, mobile stations, K groups of line repeaters, a retransmission unit of radio channels. The base station comprises an antenna-feeder module of operating frequencies, a module of digital transceivers of operating frequencies, a digital unit of distribution and switching of messages, the retransmission unit of radio channels. The line repeater comprises an antenna module of incoming radio channels of retransmission, a module of line transceivers of retransmission, a module of line converters of radio channels of retransmission to a band of operating frequencies, a module of line transceivers of operating frequencies and an output antenna module of operating frequencies.

7 Claims, 2 Drawing Sheets

SYSTEM FOR CELLULAR COMMUNICATIONS AND ITS UNITS

FIELD OF THE INVENTIONS

Present inventions relate to a field of ratio communications and may be used for a creation of systems for cellular communications, its network elements as well as other wireless systems of mobile and fixed communications, preferably for organization of the communications in sparsely populated locality and along transport lines.

BACKGROUND OF THE INVENTIONS

It is known a system for cellular communications, for example, GSM whose Radio Subsystem being also referred to as "Subsystem of base stations"—BSS (Base Station Subsystem) comprises base stations BTS (Base Transceiver Station), mobile stations MS (Mobile Station) and controllers of base stations BSC (Base Station Controller). Space distributed base stations form a coverage area and provide reception and transmission of messages from mobile stations MS and to them. Base stations communicate with the controller of base stations through corresponding wireless, cable or other communication lines via some standard interfaces. In GSM this interface is designated as A-bis interface (see, e.g. Asha Mehrotra. GSM System Engineering. Artech House, Inc., 1997, 450 p., as well as Zakirov Z. G. et al., Cellular communications of GSM standard, M.; Eco-trends, 2004, p. 9).

Base station comprises transceiver and antenna modules which realize transmitting—receiving messages in a band of operating frequencies, and a digital unit of distribution and switching DXU (Distribution Switch Unit) providing a system interface of each BTS with BSC by means of cross-switching digital data flows of transport network (E1) and separate time intervals (time slots), control and interaction with all other components of the base station, in particular, with controllers of transceivers.

In respect of a technical essence the closest prior art is a system for cellular communications comprising a switch subsystem and a base station subsystem (a radio subsystem) which are interconnected therebetween, the base station subsystem comprises Q base stations, where Q—an integer; a controller of base stations and mobile stations being coupled through radio channels of operating frequencies of the system for cellular communications with corresponding base stations; herewith each base station comprises serially coupled an antenna-feeder module of operating frequencies and a digital unit of distribution and switching whose first input-output is input-output of a base station for a connection via a corresponding communication line with a controller of base stations (see Y. A. Gromakov, Standards and systems for cellular communications. M. Eco-trends, 2000, p. 239).

Practical implementation of the known system, however, is connected with a raw of drawbacks.

Firstly, a placement of a base station is realized, as a rule, in leased rooms of buildings or in weather-proof containers placed outside a building, a rent for a leasing of rooms constitutes tenths of millions of US dollars per year. Herewith, a connection of transceivers of a base station with antennae to be placed on towers and masts is realized through expensive coaxial cables, an efficiency of connection is reduced because of attenuation of signals at reception and transmission being introduced by the cable. At standard value of transmitter output of 20 W of a base station (for example, BTS Motorola), a height of the mast (70-80) m (the attenuation introduced by the cable constitutes ~3 dB), output of a signal being fed to the antenna constitutes no more than 10 W that reduces an antenna radius of coverage by 20%. Besides, at reception of signals the attenuation of the received signal by 3 dB results in reduction of a communication range between a mobile station and a base station also by 20%.

Secondly, a usage of radio-relay lines (RRL) for connection of BTS and BSC requires a mounting on an antenna tower of a corresponding equipment and transceiving antennae. Typical specifications for an antenna tower provide for a placement of two types of an equipment and antennae. Taking into consideration feeder cables, antennae for cellular communications, RRL and cables of electric power supply a total pay load to a tower may exceed 800 kg that determines corresponding high requirements to a tower structure of a base station.

In respect of a technical essence the closest prior art for the second invention is a base station of systems for cellular communications comprising serially coupled an antenna-feeder module of operating frequencies, a module of digital transceivers of operating frequencies and a digital unit of distribution and switching whose first input-output is first input-output of a base station for a connection with a controller (see Z. G. Zakirov et al., Cellular communications of GSM standard—M.; Eco-trends, 2004, pages 85-90).

The known base station does not provide, however, an extension of a channel capacity of the system since comprises only transceivers of operating frequencies and does not include an apparatus which provides a transfer of additional channel capacity at frequencies of retransmission.

In respect of a technical essence the closest prior art for the third invention is a repeater of signals of base stations which is used for an extension of coverage area in exiting systems of mobile communications including GSM: band, channel as well as frequency spectrum transit systems, for example, 900 MHz$\leftrightarrows$1800 MHz (see, for example, A. A. Kurochkin, Alternative RF planning solutions for Coverage Deficiency, Bechtel Telecommunications Technical Journal, December 2002, pp. 37-47).

The known apparatus provides, however, only an extension of a coverage area, but "takes away", herewith, a part of a channel capacity of the base station the signals of which are retransmitted. That is, these repeaters do not allow increasing total number of communication channels in a cellular system.

In accordance with the given inventions into a system for cellular communications are introduced new network elements: a radio repeater CTR with a transition of a channel capacity (CTR—Capacity Transit Repeater) and a base station with retransmission of signals—BTS-R (BTS-Repeater).

DISCLOSURE OF THE INVENTIONS

The basis of the inventions is task of an extension of a coverage area of a communication network at simultaneous increase of a channel capacity of a system for cellular communications without increase of number of base stations and radio-relay or other communication lines connecting them with a controller, and as a consequence, a provision of reduced cost of a system for cellular communications on the whole.

Another task is an extension of functionality of the base stations owing to implementation by each of them of a function of retransmission of additional channel capacity through radio channels of retransmission to repeaters with a transition of a channel capacity.

Besides, the third task is a transition of an additional channel capacity of the system into a remote cell of the system.

The raised tasks are solved by the fact that a system for cellular communication comprises a switch subsystem and a base station subsystem which are interconnected therebetween, the system comprises Q base stations, where Q—an integer, which are interconnected with a controller of base stations, and mobile stations being coupled through radio channels of operating frequencies of the system for cellular communications with antenna input-output of operating frequencies of corresponding base stations; herewith each base station comprises a serially coupled antenna-feeder module of operating frequencies, a module of digital transceivers of operating frequencies and a digital unit of distribution and switching whose first input-output is first input-output of a connection of a base station with a controller of base stations via a corresponding communication line; in accordance with the first invention into the base station subsystem are introduced K groups of line repeaters with a transition of a channel capacity of the system, and in a structure of at least one base station is introduced a retransmission unit of radio channels of the system for cellular communications being interconnected by his first input-output with an antenna input-output of the base station for its communication through radio channels at frequencies of retransmission with its corresponding groups of repeaters with a transition of a channel capacity of the system, and by his second input-output being interconnected with a digital unit of distribution and switching of messages of the base station, the antenna input-output of the module of operating frequencies is the antenna input-output of the base station for its communication at operating frequencies with mobile stations, herewith, each group of line repeaters with a transition of a channel capacity of the system includes L intermediate and M terminal line repeaters with a transition of a channel capacity of the system being interconnected between them through radio channels at frequencies of retransmission, and at operating frequencies being interconnected with corresponding mobile stations directly or via an additional repeater of signals of operating frequencies of the system, where $L \geq 1$, $M \geq 1$; besides, the retransmission unit of radio channels of the system for cellular communications includes the interconnected antenna module of a retransmission and a module of digital transceivers of retransmission, input-output of the antenna module of a retransmission is first input-output of the retransmission unit of radio channels of the system and input-output of the module of digital transceivers of a retransmission is second input-output of the retransmission unit of radio channels of the system; each intermediate line repeater with transition of a channel capacity of the system includes a serially coupled antenna module of N incoming radio channels of retransmission, a module of N line transceivers of a retransmission, a module of line converters of n radio channels of a retransmission to a band of operating frequencies, a module of n line transceivers of operating frequencies and an output antenna module of operating frequencies, joints of retransmitted (N−n) radio channels of the module of N line transceivers of retransmission are connected via a converter of retransmission frequencies and a module of (N−n) line transceivers of transmission to an antenna module of (N−n) outcoming radio channels of transmission, where $1 \leq n < N$, $0 < q \leq L$; besides, each terminal line repeater with transition of a channel capacity of the system includes a serially coupled antenna module of P incoming radio channels of retransmission, a module of P line converters of retransmission frequencies to a band of operating frequencies of coverage area of the terminal line repeater, a module of P line transceivers of the band of operating frequencies and an output antenna module of operating frequencies.

Besides, another task is solved by the fact that a base station of a system for cellular communication comprises serially coupled an antenna-feeder module of operating frequencies, a module of digital transceivers of operating frequencies and a digital unit of distribution and switching of messages whose first input-output is first input-output of the base station for connection with a controller; in accordance with the second invention is introduced a retransmission unit of radio channels of the system for cellular communications whose first input-output is an antenna input-output of the base station for interaction through radio channels at frequencies of retransmission, second input-output being interconnected with second input-output of digital unit, an antenna input-output of the module is an antenna input-output of the base station for its communication at operating frequencies with mobile stations; besides, the retransmission unit of radio channels of the system for cellular communications comprises interconnected therebetween an antenna module of retransmission and a module of digital transceivers of retransmission, input-output of the antenna module of retransmission is first input-output of the retransmission unit of radio channels of the system, and input-output of the module of digital transceivers of retransmission is second input-output of the retransmission unit of radio channels of the system.

Besides, the third task is solved by the fact that a line repeater with transition of a channel capacity of a system of communications comprises a serially coupled antenna module of incoming radio channels of retransmission, a module of N line transceivers of retransmission, a module of line converters of n radio channels of retransmission to a band of operating frequencies, a module of n line transceivers of operating frequencies and an output antenna module of operating frequencies, joints (inputs-outputs) of retransmitted (N−n) radio channels of a module of N line transceivers of retransmission are connected via a converter of retransmission frequencies and a module of (N−n) outcoming radio channels of retransmission, where $1 \leq n < N$.

The essence of the inventions consists in that an implementation of the claimed system and its main units in the above described manner allows such mode of operation at which is increased a coverage area of the improved base station with simultaneous increase of total channel capacity of the system for cellular communications. As a result substantially decreases the number of necessary base stations and their radio-really lines for connecting them in the system for cellular communications that greatly reduces a cost of the system on the whole.

BEST VARIANT OF EMBODIMENT OF THE INVENTIONS

Figure 1:
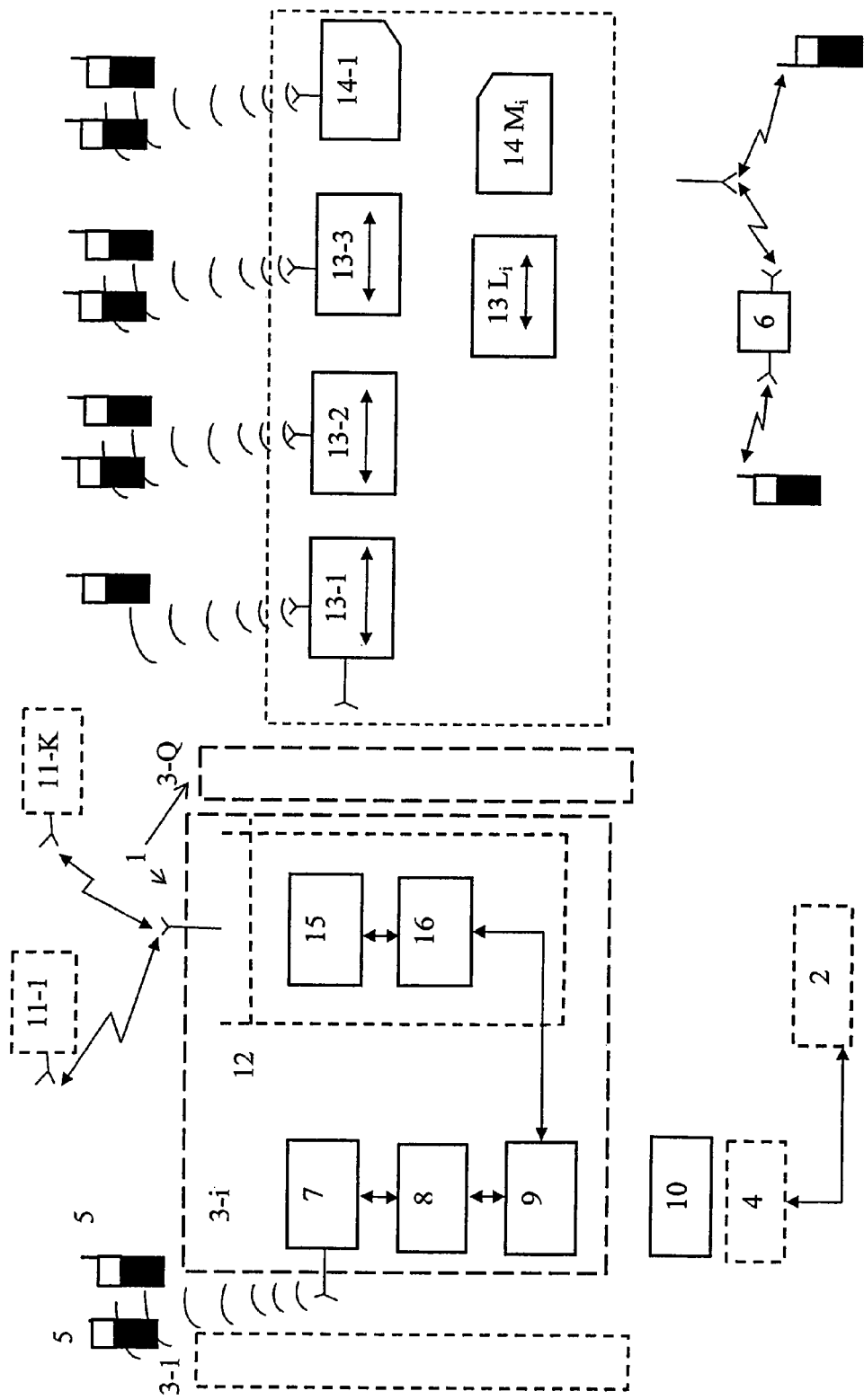
FIGS. 1 and 2 illustrate functional block-diagrams of the claimed system for cellular communications and its units.

A system for cellular communications comprises a subsystem 1 of base stations and a switch subsystem 2 which are interconnected therebetween. A subsystem 1 comprises Q base stations 3-1, ..., 3-Q, where Q—an integer; a controller 4 of base stations and mobile stations 5 being coupled through radio channels of operating frequencies of system for cellular communications with corresponding base stations.

Each base station **3-*i* comprises serially coupled an antenna-feeder module 7 of operating frequencies, a module 8 of digital transceivers and a digital unit 9 of distribution and switching whose first input-output is input-output of communication of a base station with a controller of base stations via a corresponding communication line 10**.

The characteristic property of the system is in that into a subsystem 1 of base stations are introduced K groups 11, . . . , 11-K of line repeaters with a transition of a channel capacity of the system, and in a structure of at least one base station 3$i$ is introduced a retransmission unit 12 of radio channels of the system for cellular communications being interconnected by his first input-output with the antenna input-output of a base station 3-$i$ for its communication through radio channels at frequencies of retransmission with its corresponding groups of repeaters with a transition of channel capacity of the system, and by his second input-output interconnected with a digital unit 9. The antenna input-output of the module 7 is the antenna input-output of the base station for its communication at operating frequencies with mobile stations 5. Each group 11-$j$ includes preferably L intermediate line repeaters 13-1, . . . , 13-L with a transition of a channel capacity of the system and M terminal line repeaters 14-1, . . . , 14-M with a transition of a channel capacity of the system being interconnected between them through radio channels at frequencies of retransmission, and at operating frequencies being interconnected with corresponding mobile stations 5 directly or via an additional repeater 6 of signals of operating frequencies of the system, where L≧1, M≧1.

The retransmission unit 12 of radio channels of the system for cellular communications includes interconnected antenna module 15 of retransmission and a module 16 of digital transceivers of retransmission, input-output of the antenna module 15 of retransmission is a first input-output of the retransmission unit 12 of radio channels of the system and input-output of the module 16 of digital transceivers of retransmission is a second input-output of a retransmission unit 12 of radio channels of the system.

Each intermediate line repeater 13-$q$ with a transition of a channel capacity of the system includes a serially coupled antenna module 17 with N incoming radio channels of retransmission; a module 18 with N line transceivers of retransmission, a module 19 of line converters of n radio channels of retransmission to a band of operating frequencies, a module 20 with n line transceivers of operating frequencies and an output antenna module 21 of operating frequencies, joints (inputs-outputs) 22 of retransmitted (N−n) radio channels of the module 18 of line N transceivers of retransmission are connected via a converter 23 of retransmission frequencies and a module 24 with (N−n) line transceivers of retransmission to an antenna module 25 with (N−n) outcoming radio channels of transmission, where 1≦n<N, 0<q≦L.

Each terminal line repeater 14-ϵ with a transition of a channel capacity of the system includes a serially coupled antenna module 26 with P incoming radio channels of retransmission, a module 27 with P line transceivers, a module 28 with P line converters of retransmission to a band of operating frequencies of coverage area of the terminal line repeater 14-ϵ, a module 29 with P line transceivers of the band of operating frequencies and output antenna module 30 of signals of operating frequencies.

The line repeater with transition of a channel capacity of the system may perform functions of the intermediate or terminal line repeater 13-$q$ or 14-ϵ, and in common form includes a serially coupled antenna module 17 of N incoming radio channels of retransmission, the module 18 of line N transceivers of retransmission, the module 19 of line converters of n radio channels of retransmission to a band of operating frequencies, the module 20 of n line transceivers of operating frequencies and the output antenna module 21 of operating frequencies. Joints (inputs-outputs) 22 of (N−n) retransmitted radio channels of the module 18 of N line transceivers of retransmission are connected via the converter 23 of retransmission frequencies and the module 24 of (N−n) line transceivers of retransmission to the antenna module 25 of (N−n) outcoming radio channels of transmission, where 1≦n<N.

The antenna input-output of the antenna module 17 is the antenna input-output of incoming radio channels of retransmission of the line repeater 14-ϵ, the antenna input-output of the module 21 is the antenna input-output of operating frequencies of the line repeater 13-$q$, the antenna input-output of the module 25 is the antenna input-output of outcoming radio channels of retransmission of the line repeater 13-$q$.

The antenna input-output of the module 26 is the antenna input-output of incoming radio channels of retransmission of the terminal line repeater 14-ϵ, the antenna input-output of the antenna module 30 is the antenna input-output of operating frequencies of the line repeater 14-ϵ.

The System Operates in the Following Manner.

A signal of operating frequency from a mobile station 5 is received by an antenna of a module 7 and via a receiving path of a transceiver of a module 8 enters a digital unit 9 for a digital processing of messages (demodulation, decoding, switching and et al.) and further via A-bis interface enters through a communication line 10 a controller 4 of base stations. The last controls connections between base stations and a switch subsystem 2, controls a distribution of radio channels, regulates their queue, determines the queue of transmitting messages of personal paging et al.

Figure 2:
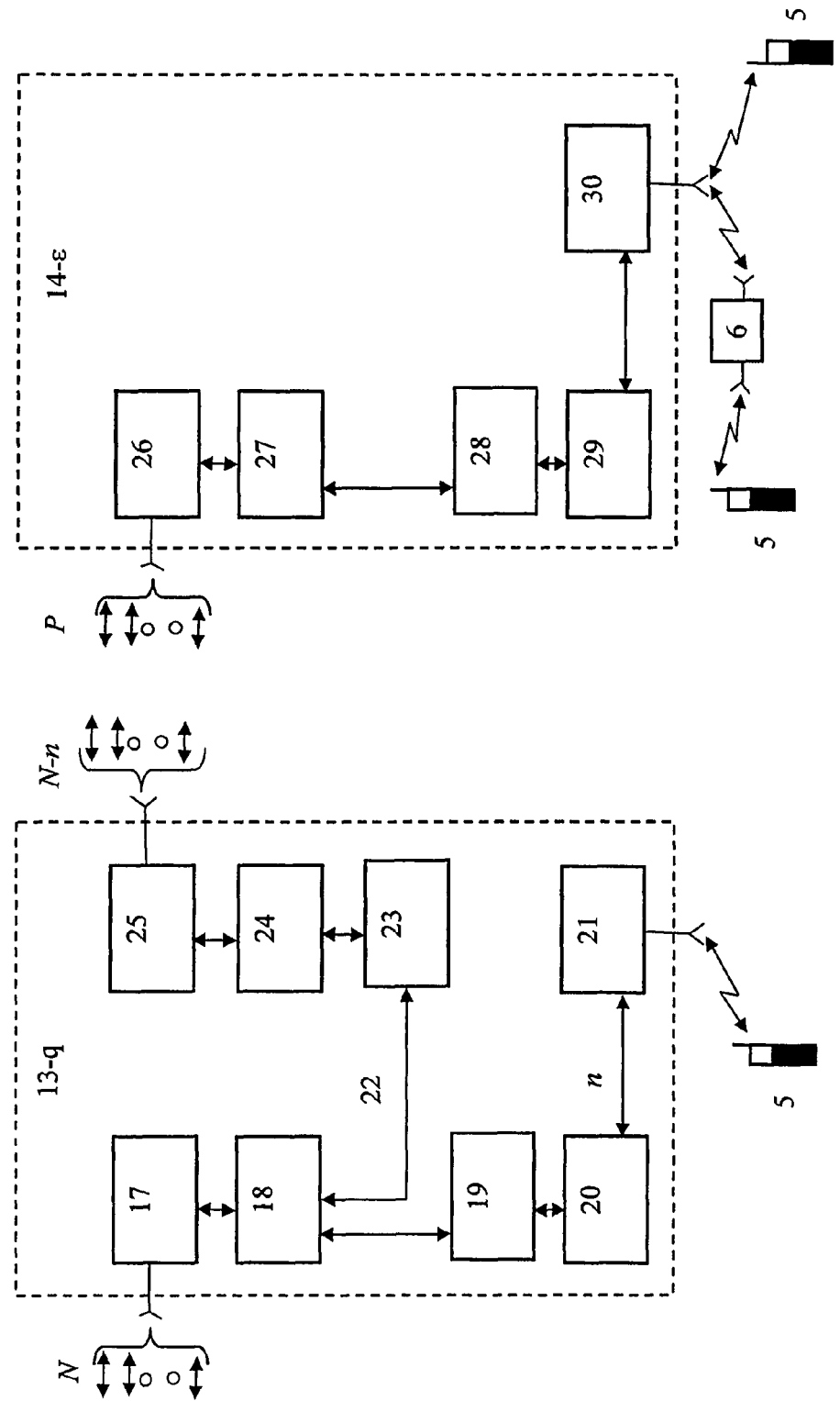

A switch subsystem 1 includes a switching center (not shown in FIGS. 1 and 2) which performs a function of switching to be necessary for a mobile station 5 (a mobile subscriber) being placed in a subsystem area and establishes a connection to the mobile subscriber and from him, as well as makes corresponding services of delivering information, granting communications and additional services.

Message transmission to a side of the mobile station (the mobile subscriber) takes place in a reverse order.

Mobile subscribers being outside the limits of an activity area of the base station (its antenna-feeder module 7) interact with the nearest to them line repeater 13-$q$ or with 14-ϵ one group of groups 11-$j$. When interacting with the mobile subscriber, for example, with a terminal line repeater 14-M (FIG. 2) the last receives from it a signal at operating frequency, converts this signal to a frequency of retransmission and transmits sequentially via a raw of line intermediate repeaters 13-L→13-(L−1)→ . . . →13-1 to antenna input-output of a corresponding base station 3-$i$ to which is connected a first input-output of a retransmission unit 12 of radio channels of the system for cellular communications. It should be noted that each of intermediate repeaters 13-1, . . . 13-L changes a frequency of retransmission when transmitting a signal for provision of normal modes of operation of transceivers (an exclusion of a self excitation of transceivers).

The signal which enters the retransmission unit 12 to an antenna module 15 of retransmission further via the receiving path of the module 16 of digital transceivers of retransmission enters the second input-output of the unit 9 of distribution and switching of messages and via his first input-output through the communication line 10 enters the controller 4 and further enters the switch subsystem 2.

The signal coming to a side of the mobile subscriber from the subsystem 2 is subjected to conversions to be analogues to above described ones in a reverse order.

It should be noted the characteristic property of operation of the intermediate and terminal line repeaters 13-$q$ and 14-ϵ. Input of the first intermediate line repeater 13-1 at its antenna module 17 is fed with N radio channels at frequencies of retransmission. Further via the receiving path of the module 18 to the module 19 of line converters come signals of dropped n channels at frequencies of retransmission which are converted in it to a band of operating frequencies and via the module 20 of line n transceivers of operating frequencies and an antenna module 21 of operating frequencies the signals enter the mobile station 5. Remaining N–n radio channels at frequencies of retransmission from output of the module 18 come for further retransmission via the converter 23 and the module 24 to the antenna module 25 of (N–n) outcoming radio channels of retransmission.

N–n incoming radio channels of retransmission enter the next intermediate line repeater 13-2, and the last terminal line repeater 14-M is fed from the last intermediate line repeater 13-L with a remainder of channel capacity of the group 11-$j$ in form of P incoming radio channels of retransmission. These signals via the antenna module 26 of incoming radio channels of retransmission and the module 27 feed the module 28 which transits them into the band of operating frequencies further come via the module 29 to the antenna module 30 of operating frequencies which is interconnected at operating frequencies with corresponding mobile stations 5 directly or via the repeater 6 of operating signals.

For example, in existing networks for cellular communications a radio coverage of transport lines is usually implemented in a line diagram owing to a sequential placement of standard base stations with towers having a height of about 70 m at the distance of (15÷20) km from each other. In the same time when using only one improved base station "BTS-R" and three repeaters CTR (two 13-q one 14-є) in accordance with the inventions an extent of a coverage area of the line may constitute (45÷60) km if the communication is implemented toward one side of the base station 3-$i$, and respectfully in addition (45÷60) km if the communication along the line is implemented in two directions from "BTS-R" (herewith is necessary to install additionally three repeaters CTR).

On lines to one base station 3-$i$ may be connected in practice two groups of 11-$j$ line repeaters for providing bidirectional radio retransmission of signals and a doubling of a coverage area along the line. For the example to be investigated GSM networks with three sections of retransmission along the line on both sides from the base station 3-$i$ the extent of a coverage area is doubled and may constitute (90÷120) km. In this case base station 3-$i$ coupled through fiber-optic, radio relay or other communication channels with a controller of base station may be placed along the lines at distance up to (90÷120) km from each other, herewith a number of leased or private for an operator of communication channels of different kinds of the base station with the controller may be reduced by from some times up to tenths of times.

A diagram of interaction of the base station 3-$i$ with the controller 4 remains standard one, but the number of base stations is reduced.

It should be noted that in the proposed structures of the system with retransmission of signals along the lines is possible to effectively implement a repeated usage of nominal values of frequencies of retransmission through two-three intervals—(2÷3) R that allows to substantially increase an efficiency of usage of a frequency spectrum on channels of retransmission.

It is important that the repeaters 13-$q$ and 14-є have materially lesser dimensions as compared with ones of standard base stations "BTS" and may be placed directly near antennae at a top of a tower. In this case are absent long feeders and corresponding attenuation of signals that increases a communication range between a mobile station and repeaters at operating frequencies as compared with a standard BTS.

A substitution of a raw of base stations (BTS) by the repeaters 13-$q$ and 14-є with a transition of a capacity and their placement on a tower allows to create standard economical project solutions, to escape a necessity to lease rooms or to mount containers, greatly reduce costs for development and maintenance of the network.

In case to be considered the places of mounting base stations may be referred to private transport, for example, fiber-optical networks of an operator for cellular communications or to networks of current operators of fixed and satellite system of communications.

In accordance with the claimed inventions channels of retransmission between the base station 3-$i$ and repeaters (CTR), as well as between a separate CTR may be created not only on basis of own frequency resource of the system for cellular communications, but in other frequency ranges being oriented toward wireless data transfer (for example, Wi-Max in ranges of 2.5 GHz; 3.3 GHz; 5.6 GHz; 10.5 GHz et al.). This is the most common and the very perspective variant of implementation of the inventions when the retransmission unit 12 of radio channels uses frequencies outside the limits of a frequency band being dedicated for mobile communications.

Owing to this it will be possible to greatly increase a flow of load (number of subscribers) when providing continuous, in respect of an area, radio coverage zones.

Industrial Applicability

The disclosed advantages of the proposed technical solutions provide for an opportunity of wide industrial application of them in a field of radio communications and may be used for a creation of systems for cellular communications as well as other wireless systems of mobile and fixed communications, preferably for organization of communications in sparsely populated locality and along transport lines.

The invention claimed is:

1. A system for cellular communications comprising a switch subsystem and a base station subsystem which are interconnected therebetween, the system comprising Q base stations, where Q is an integer, which are interconnected with a controller of base stations, and mobile stations being coupled through radio channels of operating frequencies of the system for cellular communications with antenna input-output of operating frequencies of corresponding base stations; herewith each base station comprises a serially coupled antenna-feeder module of operating frequencies, a module of digital transceivers of operating frequencies and a digital unit of distribution and switching of messages whose first input-output is a first input-output of a connection of a base station with the controller of base stations via a corresponding communication line, wherein in the subsystem of base stations are introduced K groups of line repeaters with a transition of a channel capacity of the system, and in a structure of at least one base station is introduced a retransmission unit for outputting an additional channel capacity at frequencies of retransmission of radio channels of the system for cellular communications being interconnected by its first input-output with antenna input-output of the base station for its communication through radio channels at frequencies of retransmission being different from the operating frequencies with its corresponding groups of line repeaters with a transition of a channel capacity of the system, and by a second input-output being interconnected with a digital unit of distribution and switching of messages of the base station, wherein the antenna input-output of the module of operating frequencies is the antenna input-output of the base station for its communication at operating frequencies with the mobile stations, herewith, each group of line repeaters with a transition of a channel capacity of the system includes L intermediate line repeaters and M terminal line repeaters with a transition of a channel capacity of the system, wherein the intermediate line repeaters and the terminal line repeaters are interconnected therebetween through radio channels at frequencies of retransmission, and at operating frequencies being interconnected with the corresponding mobile stations directly or via an additional repeater of signals of operating frequencies of the system, where $L \geq 1$, $M \geq 1$, such that said retransmission unit comprises an additional transceiver operating in a frequency range other than operating frequencies to thereby expand the channel capacity of the base station without using the operating bands of frequencies of cellular communication.

2. The system according to claim 1, wherein a retransmission unit of radio channels of the system for cellular communications includes the interconnected antenna module of retransmission and a module of digital transceivers of retransmission, wherein an input-output of the antenna module of retransmission is the first input-output of the retransmission unit of radio channels of the system, and an input-output of the module of digital transceivers of retransmission is the second input-output of the retransmission unit of radio channels of the system.

3. The system according to claim 1, wherein each intermediate line repeater with transition of a channel capacity of the system includes a serially coupled antenna module of N incoming radio channels of retransmission, a module of N line transceivers of retransmission, a module of line converters of n radio channels of retransmission to a band of operating frequencies where $1 \leq n < N$, a module of n line transceivers of operating frequencies where $1 \leq n < N$, and an output antenna module of operating frequencies, wherein inputs-outputs of retransmitted radio channels of the module of N line transceivers of retransmission are connected via a converter of retransmission frequencies and a module of line transceivers of transmission to an antenna module of outcoming radio channels of transmission.

4. The system according to claim 1, wherein each terminal line repeater with transition of a channel capacity of the system includes a serially coupled antenna module of P incoming radio channels of retransmission, a module of P line transceivers, a module of P line converters of retransmission frequencies to a band of operating frequencies of a coverage area of the terminal line repeater, a module of P line transceivers of a band of operating frequencies, and an output antenna module of operating frequencies.

5. A base station a specified for the system for cellular communications as described in claim 1.

6. The base station according to claim 5, wherein the retransmission unit of radio channels of the system for cellular communications comprises interconnected therebetween an antenna module of retransmission and a module of digital transceivers of retransmission, wherein an input-output of the antenna module of retransmission is the first input-output of the retransmission unit of radio channels of the system, and an input-output of the module of digital transceivers of retransmission is the second input-output of the retransmission unit of radio channels of the system.

7. An intermediate line repeater with transition of a channel capacity of the system for cellular communications at operating frequencies with mobile stations set forth in claim 1, the intermediate line repeater comprising a serially coupled antenna module of N incoming radio channels of retransmission, which frequencies of retransmission are different from operating frequencies, a module of N line transceivers of retransmission, a module of line converters of n radio channels of retransmission to a band of operating frequencies where $1 \leq n < N$, a module of n line transceivers of operating frequencies where $1 \leq n < N$, and an output antenna module of operating frequencies, wherein inputs-outputs of retransmitted radio channels of the module of N line transceivers of retransmission are connected via a converter of retransmission frequencies and a module of line transceivers of retransmission to an antenna module of outcoming radio channels of retransmission.

* * * * *